United States Patent
Kuijpers et al.

(10) Patent No.: US 6,612,821 B1
(45) Date of Patent: Sep. 2, 2003

(54) PUMP, IN PARTICULAR GEAR PUMP INCLUDING CERAMIC GEARS AND SEAL

(75) Inventors: Peterus Adrianus Johannes Maria Kuijpers, Moergestel; Remon Gerard Post, Rijnsburg, both of (NL)

(73) Assignee: Fluid Management, Inc., Wheeling, IL (US)

( * ) Notice: Subject to any disclaimer, the term of this patent is extended or adjusted under 35 U.S.C. 154(b) by 148 days.

(21) Appl. No.: 09/616,285

(22) Filed: Jul. 14, 2000

(51) Int. Cl.[7] .................................................. F03C 2/00
(52) U.S. Cl. ................. 418/152; 418/206.1; 418/206.6; 418/206.9
(58) Field of Search .............................. 418/152, 206.1, 418/206.6, 206.9

(56) References Cited

U.S. PATENT DOCUMENTS

| | | | |
|---|---|---|---|
| 3,666,000 A | * 5/1972 | Blech et al. ................... 165/8 |
| 3,874,680 A | 4/1975 | Mustoe et al. ................ 277/96 |
| 3,881,849 A | 5/1975 | Commarmot et al. ....... 418/182 |
| 4,549,862 A | 10/1985 | Stich et al. .................. 418/133 |
| 4,606,712 A | * 8/1986 | Vondra ..................... 418/206.1 |
| 4,744,738 A | * 5/1988 | Miki et al. .................. 418/152 |
| 4,747,762 A | * 5/1988 | Fairbain ..................... 418/152 |
| 4,911,609 A | 3/1990 | Anderson et al. |
| 5,569,024 A | * 10/1996 | Dummersdorf et al. ..... 418/104 |
| 5,785,510 A | 7/1998 | Altieri, Jr. et al. |
| 6,158,997 A | * 12/2000 | Post ........................ 418/206.9 |

FOREIGN PATENT DOCUMENTS

| | | |
|---|---|---|
| DE | 198 26 367 A1 | 12/1999 |
| EP | 0 866 224 A1 | 9/1998 |
| GB | 2 234 321 A | 1/1991 |
| JP | 60-132091 A * 7/1985 | ................ 418/152 |
| WO | WO 00/03813 | 1/2000 |

OTHER PUBLICATIONS

International Search Report dated Jan. 1, 2002 (4 pages).

* cited by examiner

*Primary Examiner*—Thomas Denion
*Assistant Examiner*—Theresa Trieu
(74) *Attorney, Agent, or Firm*—Marshall, Gerstein & Borun

(57) ABSTRACT

A gear pump having a housing with an inlet and an outlet. First and second gears are provided with meshing gear teeth. The gears are ceramic rotor gears which are journaled within the housing. A drive shaft drives the first gear in order to move it relative to the second gear, such as to pump a fluid from the inlet to the outlet of the housing. The housing includes an opening for the passage of the drive shaft and a seal surrounding the opening. The seal includes a first seal part rotating with the first gear, and a second seal part forming part of the housing. The first and second seal parts have facing sealing surfaces, are made of ceramic material and are loaded towards each other by a biasing member parallel to the drive shaft. In this way, a mechanical seal is created between the gear and the housing obviating the need for a seal between the drive shaft and the housing.

20 Claims, 4 Drawing Sheets

PUMP, IN PARTICULAR GEAR PUMP INCLUDING CERAMIC GEARS AND SEAL

BACKGROUND OF THE INVENTION

1. Field of the Invention

The present invention relates to a pump for pumping fluids and other flowable materials, and especially but not exclusively to a gear pump for use in a dispensing apparatus. More particularly, the gear pump may be used in a machine for making paints and the like consisting of a selection of colorants dispensed from containers through gear pumps.

2. Description of the Related Art

Due to environmental requirements and other constraints, colorants for paint contain less lubricating components and are more abrasive than some other fluids. This has set high demands on gear pumps, and one of the ways of meeting the high demands is using ceramic parts, especially for the gears. The ceramic components are very reliable and wear resistant. Moving parts hardly need any lubrication between sliding surfaces thereof.

An example of a gear pump having ceramic gears is shown in U.S. Pat. No. 5,785,510. Another gear pump having ceramic gears is disclosed in EP-A-0 866 224. A pump having ceramic seal parts is disclosed in U.S. Pat. No. 4,911,609.

SUMMARY OF THE INVENTION

It is an object of the present invention to provide an improved pump showing excellent properties, especially regarding reliability and sealing of the housing.

The object of the invention is obtained in a gear pump comprising:

a housing having an inlet and an outlet, at least first and second gears, each having gear teeth, said gear teeth of the first gear being in engagement with the gear teeth of the second gear, at least the first gear being a ceramic rotor gear which is journaled within the housing and is connected to a drive shaft for driving it in order to move it relative to the second gear, such as to pump a fluid from the inlet to the outlet of the housing, wherein the housing includes an opening for the passage of the drive shaft and a seal surrounding the opening, said seal comprising a first seal part rotating with the first gear, and a second seal part forming a part of the housing or carried thereby, said first and second seal parts having facing sealing surfaces, and wherein at least one of said first and second seal parts being made of ceramic material and the sealing surfaces being loaded towards each other by a biasing member acting parallel to the drive shaft.

The gears are preferably made of ceramic material. In a preferred embodiment, the housing includes an inner housing of ceramic material and an outer cover of injection molded plastics material forming the single piece mold of the housing.

According to another aspect of the invention the fluid pump comprises:

a housing having a wall and an inlet and outlet being formed in the housing wall, at least one rotatable ceramic pumping member which is journaled within the housing and includes a drive shaft for driving it in order to rotate it, such as to pump a fluid from the inlet to the outlet of the housing, wherein the housing includes an opening in its wall for the passage of the drive shaft and a seal surrounding the opening, said seal comprising a first seal part rotating with the pumping member, and a second seal part forming part of the housing wall, said first and second seal parts having facing sealing surfaces, and wherein said first and second seal parts being made of ceramic material and being loaded towards each other by a biasing member parallel to the drive shaft.

In an embodiment, a gear pump comprises a housing having inlet and an outlet. The housing is lined with a sealing liner that defines a pump chamber. The sealing liner is preferably in the form of two parts but a unitary construction is possible. The pump also includes first and second gears disposed in the pump chamber. Each gear has teeth and the teeth of the first gear are in engagement with or enmeshed with the gear teeth of the second gear. At least the first gear is a ceramic rotor gear which is journaled within the pump housing. The first gear is connected to a drive shaft. The housing and sealing liner include openings for passage of the drive shaft. The seal surrounds the opening of the sealing liner and rotates with the first gear. The seal and the sealing liner have facing sealing surfaces and both the seal and sealing liner are fabricated from ceramic material and are loaded towards each other by a biasing member parallel to the drive shaft. Thus, the present invention utilizes a portion of the sealing liner, which defines the pump chamber, as a seal mechanism for sealing the pump chamber with the first and second gears disposed therein.

As a result of the invention, the housing has very good and reliable sealing properties since the ceramic seal parts do not need lubrication and are very resistant to wear. The structure of the seal can be simple and assembly is easy, in particular if the gears only have a single bearing journal on one side as thereby aligning problems are avoided. Especially when ceramic components are used, the gear pump is very durable and requires no maintenance.

The invention will hereafter be further explained with reference to the drawing showing an embodiment of the invention by way of example.

DESCRIPTION OF PREFERRED EMBODIMENTS

Figure 1:
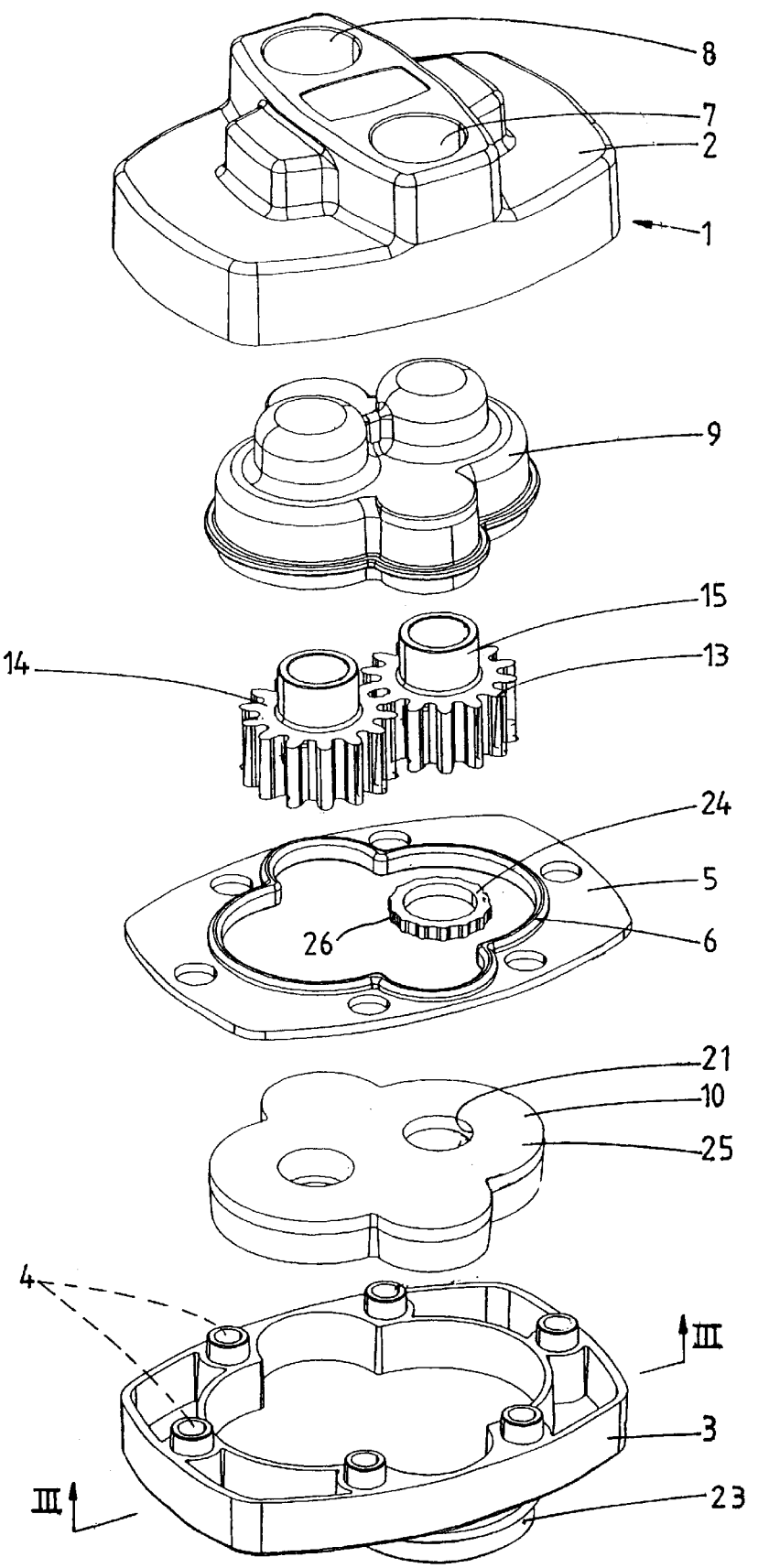
FIGS. 1 and 2 are perspective exploded views of a first embodiment of the gear pump according to the invention, as seen from two different directions.
Figure 2:
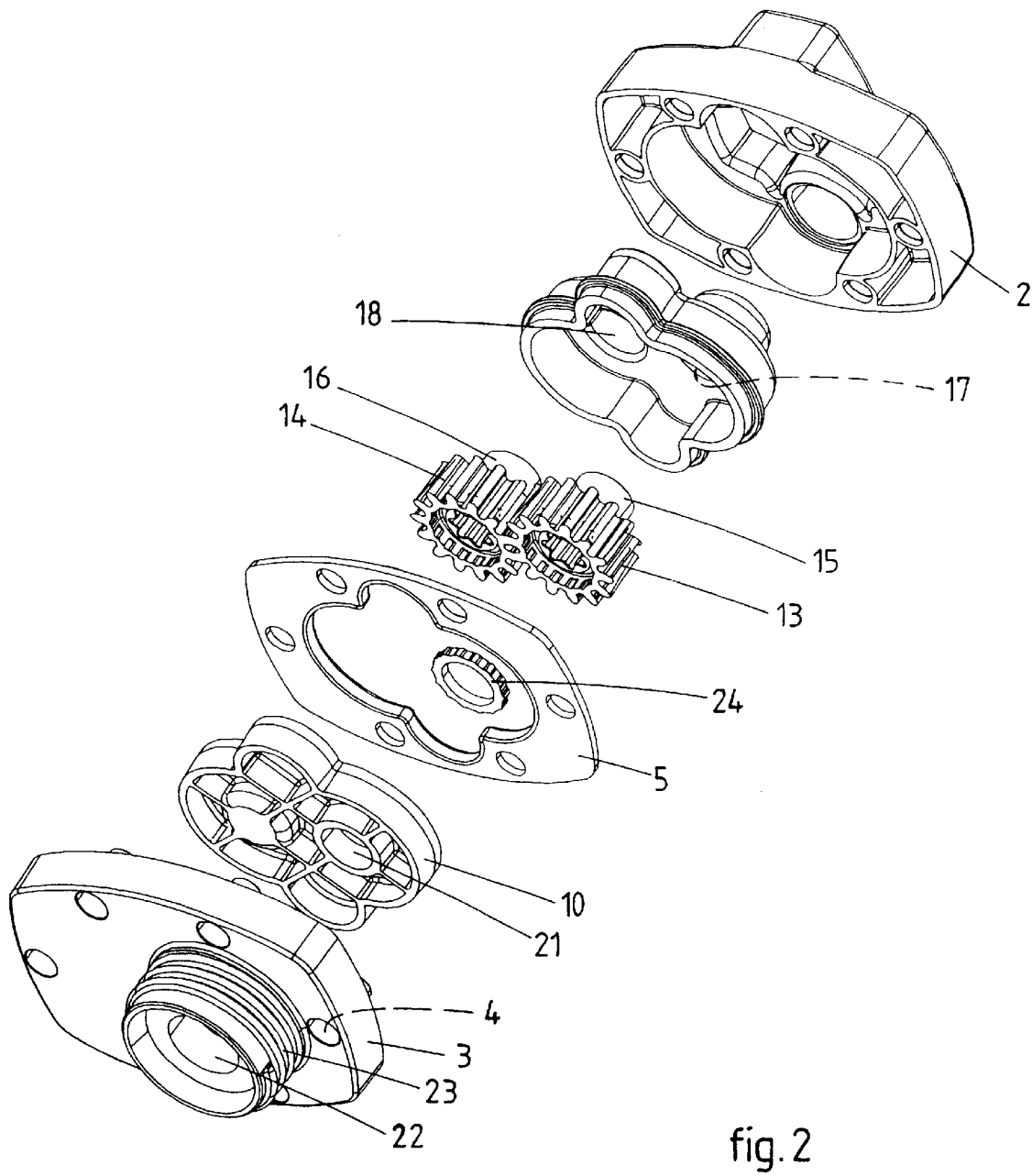
Figure 3:
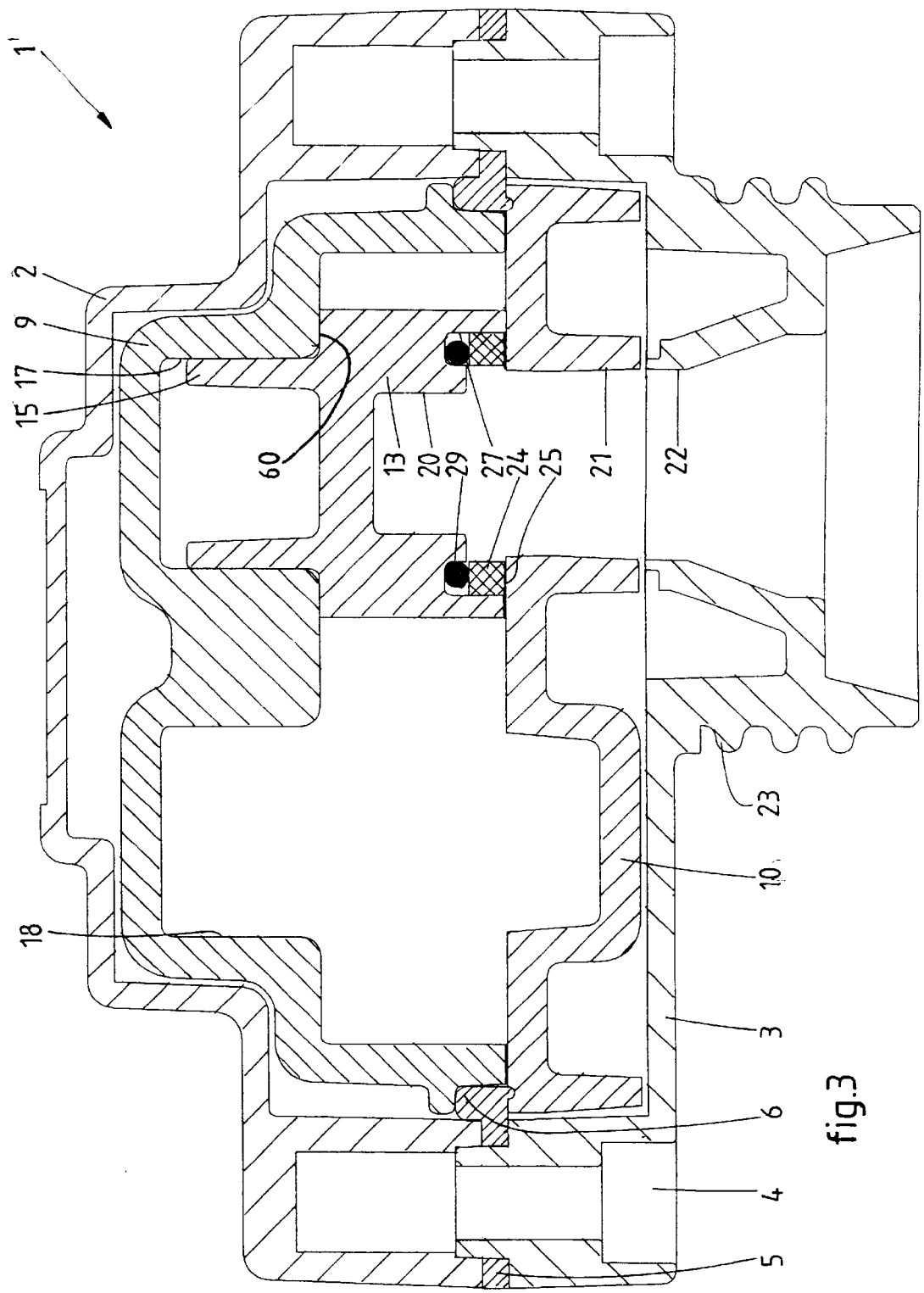
FIG. 3 is sectional view of the assembled pump along the line III—III in FIG. 1 on a larger scale.

FIGS. 1–3 show a first embodiment of a gear pump according to the present invention. This gear pump is intended to pump fluids and may for example be used in a coloring apparatus for mixing color components into the desired mixture. Such fluids are abrasive and do not or hardly contain lubricating components.

The gear pump includes a housing 1 which, in this embodiment, comprises an outer cover formed by a first cover part 2 and a second cover part 3 which are attached to each other by fastening means 4, such as screws, bolts, bonding or the like. To seal both cover parts 2, 3, there is provided a rubber seal 5 positioned between both cover parts 2, 3 and including an inward positioning rib 6. The cover parts 2, 3 may be formed of plastic material, for example by injection molding, but it is also feasible to make the cover parts 2, 3 from a metal or other material. FIG. 1 shows that the housing 1 includes an inlet opening 7 and an outlet opening 8 through which fluid may enter and leave the pump housing 1 depending on the operation of the pump. It is not shown that the inlet and outlet openings 7, 8 include connection means, for example inner screw thread to connect lines or conduits or the like to conduct the fluid.

FIGS. 1–3 show that the housing 1 may further comprise lining parts 9, 10 which are preferably made of ceramic material. The lining parts 9, 10 may be attached to the respective cover part 2, 3 through any suitable bonding, for example by injecting glue between the lining parts 9, 10 and their respective cover parts 2, 3, but also direct molding of the cover parts 2, 3 on the respective lining parts 9, 10 is conceivable. Although not shown, the lining part 9 includes inlet and outlet ports which are in communication with the respective inlet and outlet openings 7, 8, and open into the pump housing inner at the suction and pressure sides, respectively.

The pump according to the invention includes at least one pumping member and in this embodiment in which the pump is a gear pump, the pumping members consist of a first rotary gear 13 and a second rotary gear 14. Both gears 13, 14 have an outer toothing having a plurality of external teeth spaced around the circumference, the toothings of both gears 13, 14 intermeshing in a sealing manner in order to pump fluid from the suction side to the pressure side of the pump upon rotation of the gears 13, 14. The axes of the gears 13, 14 are substantially parallel and each gear 13, 14 includes integral bearing journal 15, 16 which are journaled in corresponding bearing journal cavities 17, 18 in the first lining part 9. Both bearing journals 15, 16 are preferably hollow and are open towards the adjacent wall of the first lining part 9.

Preferably, both gears 13,14 are made of ceramic material and are directly journaled in the bearing journal cavities 17, 18 of the lining part 9 without external lubrication. Both gears 13, 14 are journaled only on one side. On the opposite side, the gears 13, 14 are resting with their face against a flat inner side of the ceramic second lining part 10. Due to this one sided bearing, there are no misalignment problems between the lining parts 9, 10.

The first gear 13 is driven by a driving means, such as an electric motor, through a drive shaft 19 (not shown in the first embodiment). This drive shaft is preferably separate from the first gear 14 and includes a coupling part such as a key (not shown) engaging into a counter coupling part or recess 20, preferably in such manner that the drive shaft 19 and the first gear 13 are connected in a rotationally fixed manner, but small misalignments or axial movements are allowed.

To allow passage of the drive shaft through the housing 1, both the second lining part 10 and the second cover part 3 of the housing 1 include passage openings 21, 22 respectively, allowing passage of the drive shaft at least with a loose fitting to allow play between the shaft and the housing. The second cover part 3 includes a protruding housing part having connection means, for example screw thread 23 which is coaxial with the passage opening 22 to connect the pump to the drive means.

In order to seal the pump interior from the exterior at the position of the passage openings 21, 22, there is provided a special mechanical seal which does not act between the drive shaft 19 and the housing, but between the first gear 13 and the housing 1, in particular the second lining part 10 of the housing 1. In this first embodiment, the seal includes a first seal part 24, which is configured as a ring, and a second seal part 25 which is a wall portion of the second lining part 10. The sealing ring 24 forming the first seal part has configured outer circumference 26 fitting into a cavity 27 of the first gear 13 having a mating inner circumference 28. Dimensions of the sealing ring 24 and the cavity 27 and their interfaces are such that they are mounted in a rotationally fixed manner but with a sliding fit. Deeper within the cavity 27 there is arranged a biasing member, here in the form of a O-ring 29 biasing the first seal part or sealing ring 24 towards the second seal part 25, so that the co-operating sealing surfaces of both seal parts 24, 25 are kept in sealing engagement with each other. Due to the sliding fit of the sealing ring 24 it is possible that the first seal part 24 is biased or loaded with respect to the first gear 13 and towards the second seal part 25. The biasing member 29 is mounted at the side of the sealing ring 24 which is facing away from the second seal part 25, so that the biasing member is able to exert a pressure on the first seal part 24. The dimension of the various parts should be such that the O-ring 29 is deformed when the gear pump is assembled so that its elasticity will cause the pressure on the sealing ring 24.

If the gear pump is in use, there is created a pressure within the housing interior, said pressure being exerted on the side force 60 of the first gear 13 opposite from the seal. Thus, during use of the gear pump there is an hydraulic pressure which assists in sealing the gear pump. This pressure also keeps the face of the gear 13 surrounding the sealing ring 24 in engagement with the inner wall of the second lining part 10 of the housing 1. When the gear pump is out of use, the biasing member keeps the first seal part 24 in engagement with the second seal part 25 and thus prevent leakage when the gear pump is not in use. Also if small misalignments occur between the first gear 13 and the second lining part 10, the biasing means maintains a proper contact between the surfaces of the first and second seal parts 24 and 25.

Figure 4:
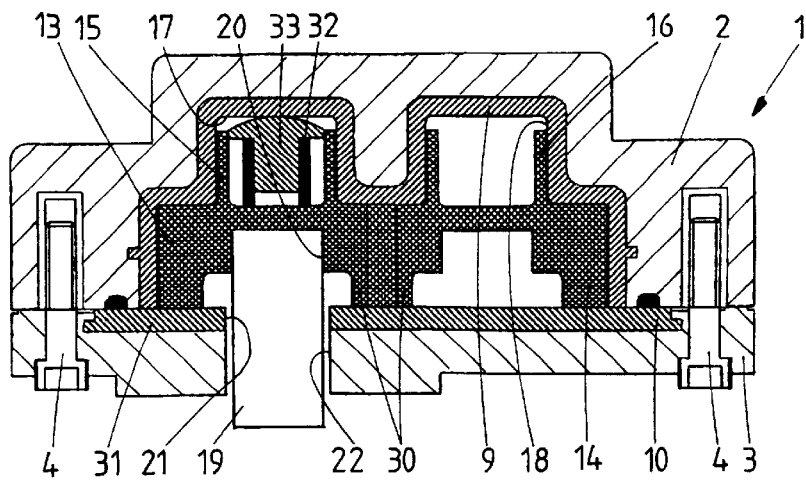
FIGS. 4, 5 and 6 are schematic cross-sectional views of further embodiments of the pump according to the invention.

FIG. 4 schematically shows a second embodiment of the gear pump according to the invention. Here, the first seal part 24 is a part of the first gear 13 which faces the second lining part 10. This second lining part 10 forms the second seal part 25. In this embodiment, a biasing member 32 is mounted between the first gear 13 and the first lining part 9, so that the static pressure of the biasing member is exerted on the first gear 13. The biasing member 32 in this embodiment is a hollow rubber bush 32 having a ceramic cap 33 which is in rotating contact with the first lining part 9 and due to this ceramic-ceramic contact there is only a very low friction force between the biasing member 32 and the housing 1. In this embodiment, the second lining part 10 is a simple flat plate or sheet which can be manufactured in a very simple way.

Figure 5:
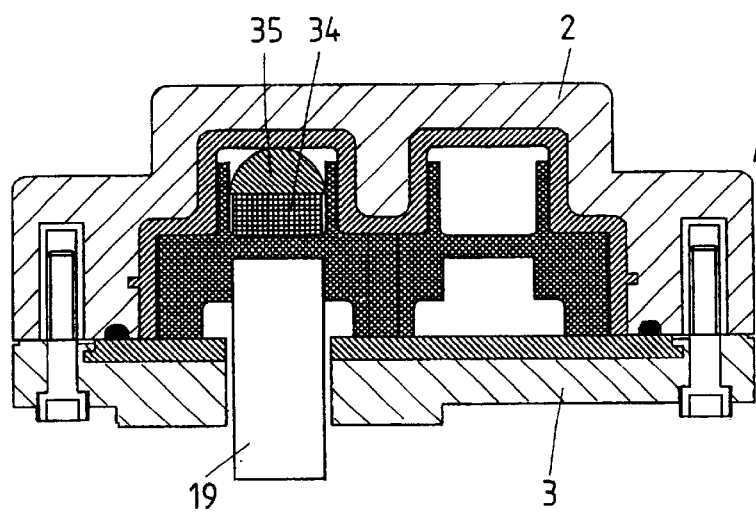

FIG. 5 shows a further embodiment which is similar to that of FIG. 4, except for the biasing member which is in this case a solid rubber block or other solid spring member 34 having a ceramic cap 35 to keep the rotating friction force between the biasing member 34 and the second lining part 10 of the housing 1 to a minimum.

Figure 6:
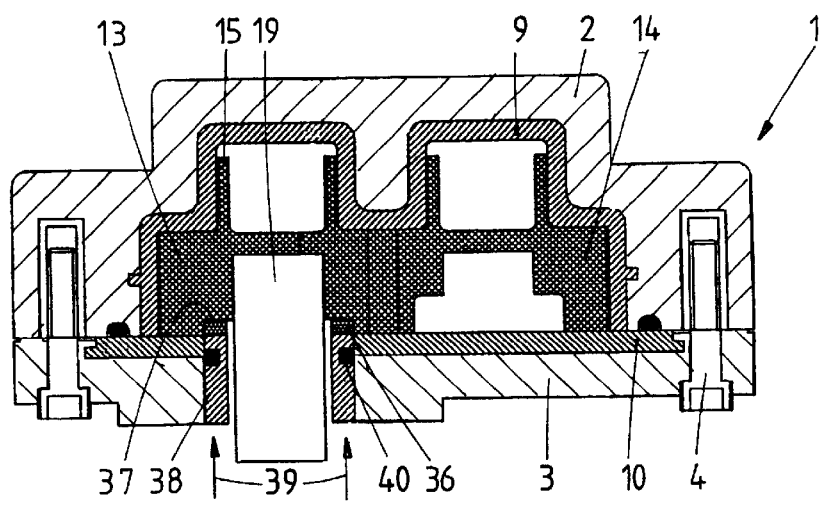

FIG. 6 shows a last embodiment in which the first seal part is again a separate sealing ring 36, although it may also form an integral part of gear 13. A cavity 37 in the first gear 13 is made smaller relative to cavity 27 of the first embodiment so that only the sealing ring 36 is accommodated in cavity 37. The second seal part is in this case a ceramic bush 38 which is mounted in the wall of the housing 1, that is through the second cover part 3 and the second lining part 10. The ceramic bush 38 is mounted with a sliding fit such that an external biasing member 39 may exert a biasing force onto the second seal part 38 towards the first seal part 36. An O-ring 40 or other sealing member is provided between the ceramic bush 38 and the wall of the housing 1.

The embodiments having a first seal part which is separate from the first gear 13 have the advantage that the ceramic material thereof may be chosen to provide excellent sealing properties without being limited by the requirements which should be met by the gear. For example, the sealing ring 24, 36 may be made of silicon carbide whereas the gears 13, 14 may be made of aluminium oxyde/zirconium (ZTA, Zirconia Tuffened Alumina). The lining parts 9, 10 may be formed of aluminium oxyde. Other technical ceramics that can be used are for example silicon nitride and boron carbide. At least the surfaces of the ceramic seal parts are treated by grinding or lapping to obtain a very smooth surface.

From the foregoing it will be apparent that the invention provides a gear pump, which is easy to assemble, which is cost effective and does not need seals to seal housing parts.

The invention is not limited to the embodiments shown in the drawing and described hereinbefore, which may be varied in different manners within the scope of the invention. For example, the gears may also be made as one stationary gear and one revolving gear. The cover of the housing may also be molded in another process. The drive shaft can be integrated with the first gear. Although the invention obviates the need for a seal between the drive shaft and the housing, it is possible to provide an additional seal there.

What is claimed is:

1. Gear pump comprising:
   a housing having an inlet and an outlet;
   the housing being at least partially lined with a sealing liner, the sealing liner defining a pump chamber;
   at least first and second gears disposed in the pump chamber, each having gear teeth, said gear teeth of the first gear being in engagement with the gear teeth of the second gear,
   at least the first gear being a ceramic rotor gear which is journaled within the pump chamber and includes a drive shaft for driving it in order to move it relative to the second gear, such as to pump a fluid from the inlet to the outlet of the housing,
   wherein the housing and the sealing liner including openings for the passage of the drive shaft; and
   a seal surrounding the opening and rotating with the first gear, said seal and sealing liner having facing sealing surfaces, and wherein said seal and sealing liner being made of ceramic material and being loaded towards each other by a biasing member parallel to the drive shaft.

2. Gear pump according to claim 1, wherein the sealing liner comprises a flat portion on the side of the housing that includes the passage opening.

3. Gear pump according to claim 2, wherein the housing further comprising an outer cover preferably of injection molded plastic material.

4. Gear pump according to one of claims 1, wherein the first seal part is integral with the first gear.

5. Gear pump according to claim 4, wherein the biasing member is provided between the sealing liner and the first gear, on the side of the first gear facing away from the seal and thus biasing the first gear with respect to the sealing liner.

6. Gear pump according to claim 1, wherein the seal is a separate ring of ceramic material.

7. Gear pump according to claim 6, wherein the first gear having a cavity surrounding the drive shaft, the ring of the seal being mounted in said cavity.

8. Gear pump according to claim 7, wherein the ring of the seal is mounted in said cavity with a sliding fit, and wherein the biasing member is also mounted in the cavity on the side of the ring opposite to the sealing surface thereof and biasing the ring with respect to the first gear.

9. Gear pump according to claim 8, wherein the biasing member is a O-ring.

10. Gear pump according to claim 1, wherein each of the first and second gears has an integral bearing journal on the side of the gears opposite from the seal of the first gear, said bearing journal being journaled in a respective bearing cavity in the sealing liner.

11. Gear pump according to claim 10, wherein the bearing journal is hollow forming a bearing journal cavity being open to the housing, and wherein the biasing member is accommodated in the bearing journal cavity such that it engages the housing and thus biasing the first gear with respect to the sealing liner.

12. Gear pump according to claim 11, wherein the biasing member is a chemically resistant plastic or rubber-like spring element including a low friction cap member engaging the housing.

13. Gear pump according to claim 1, wherein the sealing liner comprises a bushing surrounding the drive shaft and is mounted in the housing with a sealed sliding fit, the biasing member being mounted outside the housing and biasing the bushing towards the seal.

14. Gear pump according to claim 13, wherein the seal is a separate ring of ceramic material, and wherein the first gear having a cavity surrounding the drive shaft, the ring of the seal part being mounted in said cavity.

15. Gear pump according to claim 1, wherein the drive shaft of the first gear is a separate drive shaft comprising an unround coupling part adapted to engage with a coupling counterpart formed in the first gear.

16. Gear pump according to claim 1, wherein the second gear is made of ceramic material.

17. Gear pump according to claim 1, wherein the second gear is an idle gear wheel, and the first and second gears are rotatable around a respective axis and have external teeth.

18. Gear pump according to claim 17, wherein the axes of the first and second gears are substantially parallel.

19. Apparatus for dispensing liquid colorant components, comprising a plurality of gear pumps according to claim 1.

20. Fluid pump comprising:
   a housing having a wall and an inlet and outlet being formed in the housing wall;
   the housing being at least partially lined with a sealing liner, the sealing liner defining a pump chamber;
   at least one rotatable caramic pumping member which is journaled within the pump chamber and includes a drive shaft for driving it in order to rotate it, such as to pump a fluid from the inlet to the outlet of the housing;
   wherein the housing and the sealing liner including openings for the passage of the drive shaft; and
   a seal surrounding the opening and rotating with the pumping member, said seal and sealing liner having facing sealing surfaces, and wherein said seal and sealing liner being made of ceramic material and being loaded towards each other by a biasing member parallel to the drive shaft.

* * * * *